(12) United States Patent
Jeong et al.

(10) Patent No.: US 11,862,355 B2
(45) Date of Patent: Jan. 2, 2024

(54) METHOD OF REMOVING RADIOACTIVE STRUCTURE FROM A WALL IN A NUCLEAR POWER PLANT

(71) Applicant: KOREA ATOMIC ENERGY RESEARCH INSTITUTE, Daejeon (KR)

(72) Inventors: Kwanseong Jeong, Sejong (KR); Seung-Kook Park, Daejeon (KR); Inhye Hahm, Donghae-si (KR); Jae Hyun Ha, Daejeon (KR); Sang Bum Hong, Daejeon (KR); Bum Kyoung Seo, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 38 days.

(21) Appl. No.: 17/262,394

(22) PCT Filed: May 22, 2019

(86) PCT No.: PCT/KR2019/006131
§ 371 (c)(1),
(2) Date: Jan. 22, 2021

(87) PCT Pub. No.: WO2020/022629
PCT Pub. Date: Jan. 30, 2020

(65) Prior Publication Data
US 2021/0296017 A1    Sep. 23, 2021

(30) Foreign Application Priority Data
Jul. 27, 2018 (KR) .................. 10-2018-0088023

(51) Int. Cl.
*G21D 1/00* (2006.01)
*G21C 19/32* (2006.01)

(52) U.S. Cl.
CPC ............. *G21D 1/003* (2013.01); *G21C 19/32* (2013.01)

(58) Field of Classification Search
CPC .......... G21D 1/003; G21C 19/32; G21F 9/34; G21F 9/30; B23B 39/161; B23B 39/22;
(Continued)

(56) References Cited

U.S. PATENT DOCUMENTS 2,599,770 A * 6/1952 Marcerou ............. B28D 1/041
                                                     175/207
3,331,455 A * 7/1967 Anderson, Jr. ......... B23B 51/04
                                                     175/386
(Continued)

FOREIGN PATENT DOCUMENTS

DE    19906722 A1 *  8/2000 ............. B28D 1/041
EP     3888828 A1 * 10/2021 ............... B23C 3/00
(Continued)

OTHER PUBLICATIONS

Hwang, Doo-Seong, Gyeong-Hwan Jeong, and Jei-Kwon Moon. "Decommissioning of TRIGA Mark-II Type Reactor." (2012). (Year: 2012).*
(Continued)

*Primary Examiner* — Jack W Keith
*Assistant Examiner* — Jinney Kil
(74) *Attorney, Agent, or Firm* — Harness, Dickey & Pierce, P.L.C.

(57) ABSTRACT

The present disclosure relates to a method of removing a radioactive structure from a nuclear power plant. The method includes flattening at least a portion of an outer surface of a drilling portion of a wall of a nuclear reactor vessel when the portion of the outer surface is uneven, wherein the radioactive structure is buried in the wall and the drilling portion is adjacent to the radioactive structure,
(Continued)

installing a drilling device in the flattened drilling portion and performing a drilling operation, extracting the radioactive structure from the wall, and cutting the extracted radioactive structure and storing pieces of the cut radioactive structure in a shielding container.

8 Claims, 4 Drawing Sheets

(58) Field of Classification Search
CPC ......... B23B 41/003; B23B 51/04; B28D 1/14; E04G 23/08; E21B 7/046; E21B 10/02; E21B 31/00
USPC .......... 376/272; 588/3; 83/930; 175/62, 108, 175/332, 355, 404; 299/39.9, 59, 60, 299/110; 408/42, 53, 204
See application file for complete search history.

(56) References Cited

U.S. PATENT DOCUMENTS

| | | | | |
|---|---|---|---|---|
| 4,813,313 A * | 3/1989 | Ichikawa | ............... | B28D 1/045 |
| | | | | 976/DIG. 293 |
| 4,869,227 A * | 9/1989 | Schuldei | ............... | B23D 47/02 |
| | | | | 299/39.3 |
| 5,173,250 A * | 12/1992 | Ichikawa | ............... | B28D 1/088 |
| | | | | 376/310 |
| 5,263,062 A * | 11/1993 | Guigon | ............... | G21F 9/30 |
| | | | | 376/260 |
| 5,329,562 A * | 7/1994 | Kubo | ............... | B23D 57/0084 |
| | | | | 376/260 |
| 6,959,771 B2 * | 11/2005 | Mazaki | ............... | C09K 3/1409 |
| | | | | 175/57 |
| 7,381,010 B2 * | 6/2008 | Alexander | ............... | G21F 9/34 |
| | | | | 405/303 |
| 2007/0181342 A1 * | 8/2007 | Duncan | ............... | E21B 10/02 |
| | | | | 175/57 |
| 2014/0142365 A1 * | 5/2014 | Soyfer | ............... | G21F 9/30 |
| | | | | 588/20 |
| 2015/0226006 A1 * | 8/2015 | Connesson | ............... | B28D 1/14 |
| | | | | 175/57 |
| 2020/0122242 A1 * | 4/2020 | Honey | ............... | B23B 35/00 |
| 2021/0158981 A1 * | 5/2021 | Hwang | ............... | G21F 9/28 |
| 2021/0174978 A1 * | 6/2021 | Hwang | ............... | G21F 9/30 |

FOREIGN PATENT DOCUMENTS

| | | | | |
|---|---|---|---|---|
| FR | 2939705 A1 * | 6/2010 | ............... | B28D 1/14 |
| JP | S61-044400 A | 3/1986 | | |
| JP | 2014-102110 A | 6/2014 | | |
| KR | 10-2006-0058778 A | 5/2006 | | |
| KR | 10-2007-0077824 A | 7/2007 | | |
| KR | 10-2009-0069954 A | 7/2009 | | |

OTHER PUBLICATIONS

Varley, Geoff, and Chris Rusch. "An Applied Study on the Decontamination and Decommissioning of the Map Tube Facility 317 Area Argonne National Laboratory, Chicago." No. SKI-R-05-34. Swedish Nuclear Power Inspectorate, 2005. (Year: 2005).*
Rast, R.S. "Data Quality Objectives for Single-Shell Tank Sidewall Coring Project." EnergySolutions Federal Services, Inc. 2011. (Year: 2011).*
Lauridsen, Kurt. Decommissioning of DR 1, Final report. No. DD-18 (EN)/REV. 1. Danish Decomissioning, 2006. (Year: 2006).*
Strufe, N. "Decommissioning of DR 2. Final report." (2009). (Year: 2009).*
Tachibana, Mitsuo. "Experiences on Research Reactors Decommissioning in the NSRI of the JAEA." International Nuclear Safety Journal 3.4 (2014): 16-24. (Year: 2014).*
International Search Report for International Application No. PCT/KR2019/006131 dated Aug. 21, 2019.

* cited by examiner

METHOD OF REMOVING RADIOACTIVE STRUCTURE FROM A WALL IN A NUCLEAR POWER PLANT

CROSS-REFERENCE TO RELATED APPLICATIONS

This application is a national phase under 35 U.S.C. § 371 of PCT International Application No. PCT/KR2019/006131 which has an International filing date of May 22, 2019, which claims priority to Korean Application No. 10-2018-0088023, filed Jul. 27, 2018, the entire contents of each of which are hereby incorporated by reference.

TECHNICAL FIELD

The present disclosure relates to a method of removing a nuclear power plant activation structure.

BACKGROUND

In general, in a nuclear reactor of a nuclear power plant, when an operation of the nuclear reaction is terminated, abolishment of the nuclear power plant is required.

In this case, in the measures to abolish the nuclear power plant, a nuclear fuel is removed to reduce a risk of a nuclear fuel material and decontamination work is performed to reduce the radioactive contamination of an equipment system. Moreover, after a safe storage period to reduce an exposure of a worker and an amount of radioactive waste during a full-scale dismantling work, dismantling work inside the nuclear power plant, dismantling work outside the nuclear power plant, and demolition work are performed.

Meanwhile, various nuclear power plant activation structures are provided in the reactor. Here, the nuclear power plant activation structure refers to a structure which is radiated by absorption of neutrons, that is, has radioactivity, among discarded structures which are generated when the nuclear reactor whose operation is terminated is dismantled.

In particular, a nuclear power plant activation structure, such as a neutron guide tube or a beam port which connects different types of devices to the nuclear reactor for a measurement or test, is buried in a horizontal direction of the reactor. Accordingly, a high-level technology is required to dismantle the beam port from the nuclear reactor, and thus, there are problems that a dismantling period is prolonged and a dismantling cost increases.

SUMMARY

Embodiments of the present disclosure provide a method of removing a nuclear power plant activation structure capable of easily dismantling the nuclear power plant activation structure from a nuclear reactor to reduce a dismantling period and a dismantling cost.

In accordance with an embodiment of the present disclosure, there is provided a method of removing a nuclear power plant activation structure, including: flattening at least a portion of a wall surface of a peripheral portion of a wall of a nuclear reactor, the wall including a buried portion in which a nuclear power plant activation structure is buried and the peripheral portion circumferentially surrounding the buried portion; installing a drilling device in the flattened peripheral portion and performing a drilling operation; removing the nuclear power plant activation structure from the buried portion; and cutting the removed nuclear power plant activation structure and storing pieces of the cut nuclear power plant activation structure in a shielding container, wherein said performing the drilling operation includes: performing a first drilling operation including a dry drilling operation using a first drilling device; and performing a second drilling operation including a wet drilling operation using a second drilling device, and wherein said performing the second drilling operation includes: collecting a cooling medium used in the wet drilling operation using a cooling medium collection unit; transferring the cooling medium collected by the cooling medium collection unit from the cooling medium collection unit to a first water collection tank; depositing dust or sludge contained in the cooling medium in a lower portion of the first water collection tank to separate at least a portion of the dust or sludge contained in the cooling medium; purifying the cooling medium from which the dust or sludge is separated, and resupplying the purified cooling medium to reuse the purified cooling medium as the cooling medium of the second drilling device.

According to the embodiments of the present disclosure, it is possible to easily dismantle the nuclear power plant activation structure from a nuclear reactor to reduce a dismantling period and a dismantling cost.

DETAILED DESCRIPTION

Hereinafter, specific embodiments for realizing the spirit of the present disclosure will be described in detail with reference to the accompanying drawings.

In describing the embodiments of the present disclosure, the detailed descriptions of well-known functions or configurations will be omitted if it is determined that the detailed descriptions of well-known functions or configurations may unnecessarily make obscure the spirit of the present disclosure.

Specific terms in the present disclosure are used simply to describe specific embodiments without limiting the present disclosure. An expression used in the singular encompasses the expression of the plural, unless it has a clearly different meaning in the context.

Hereinafter, a method of removing a nuclear power plant activation structure according to an embodiment of the present disclosure will be described with reference to the drawings.

Figure 1:
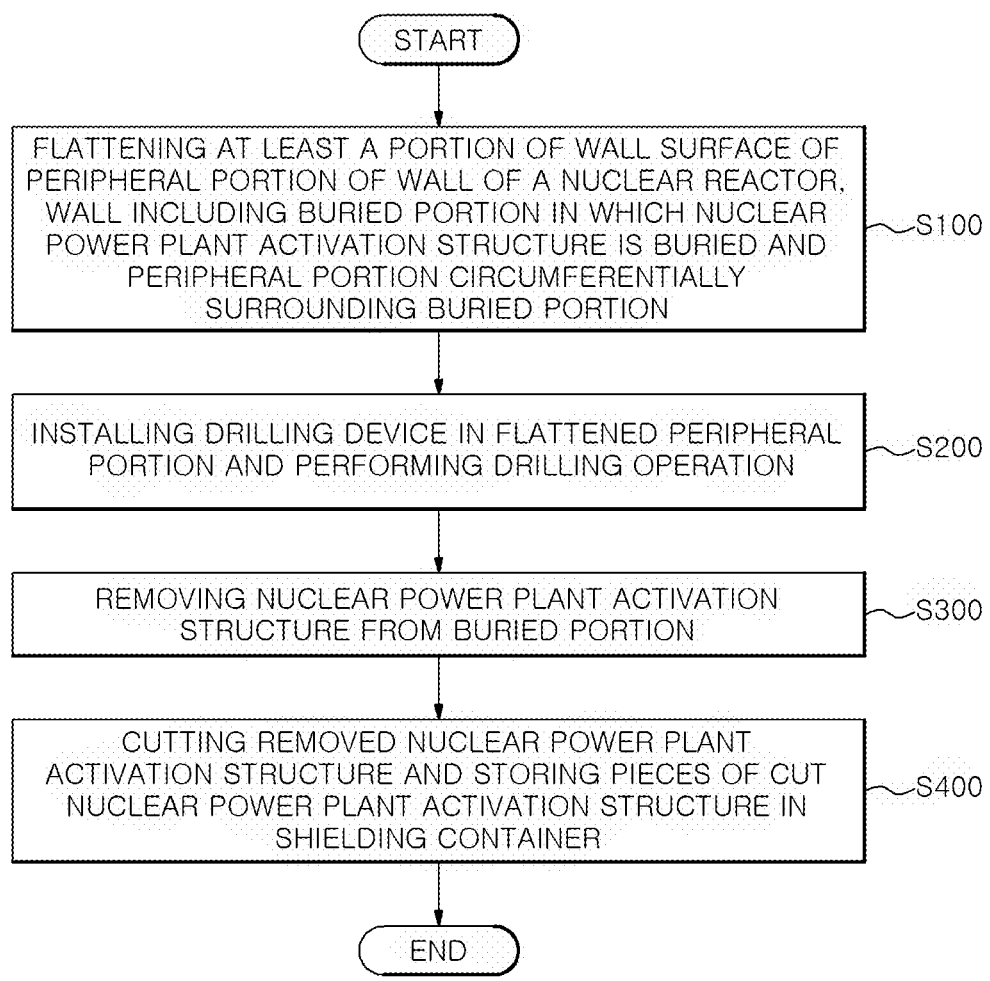
FIG. 1 is a flowchart illustrating a method of removing a nuclear power plant activation structure according to an embodiment of the present disclosure.
Figure 2:
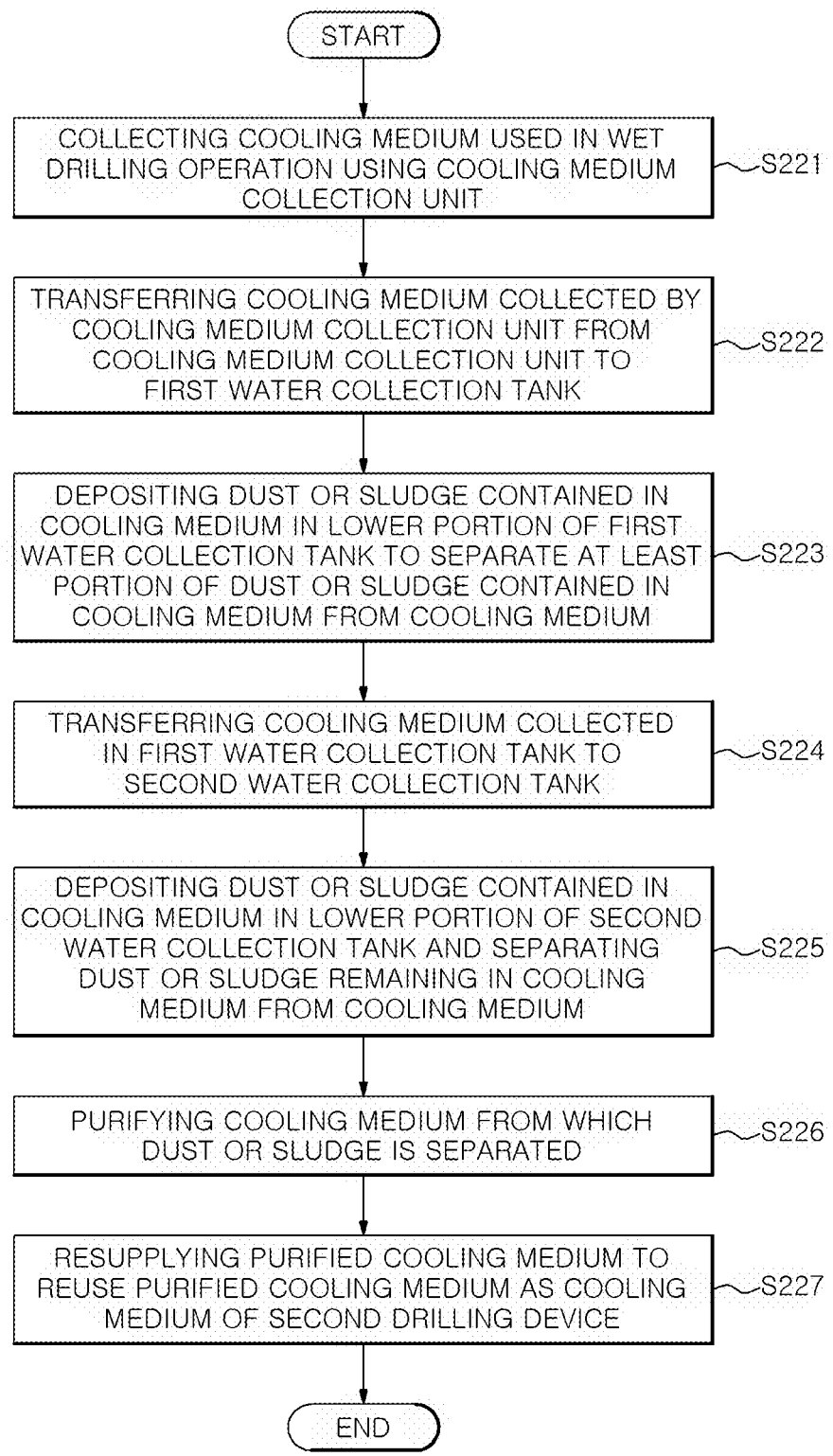
FIG. 2 is a flow chart showing a step of performing a second drilling operation in the method of removing a nuclear power plant activation structure of FIG. 1.
Figure 3:
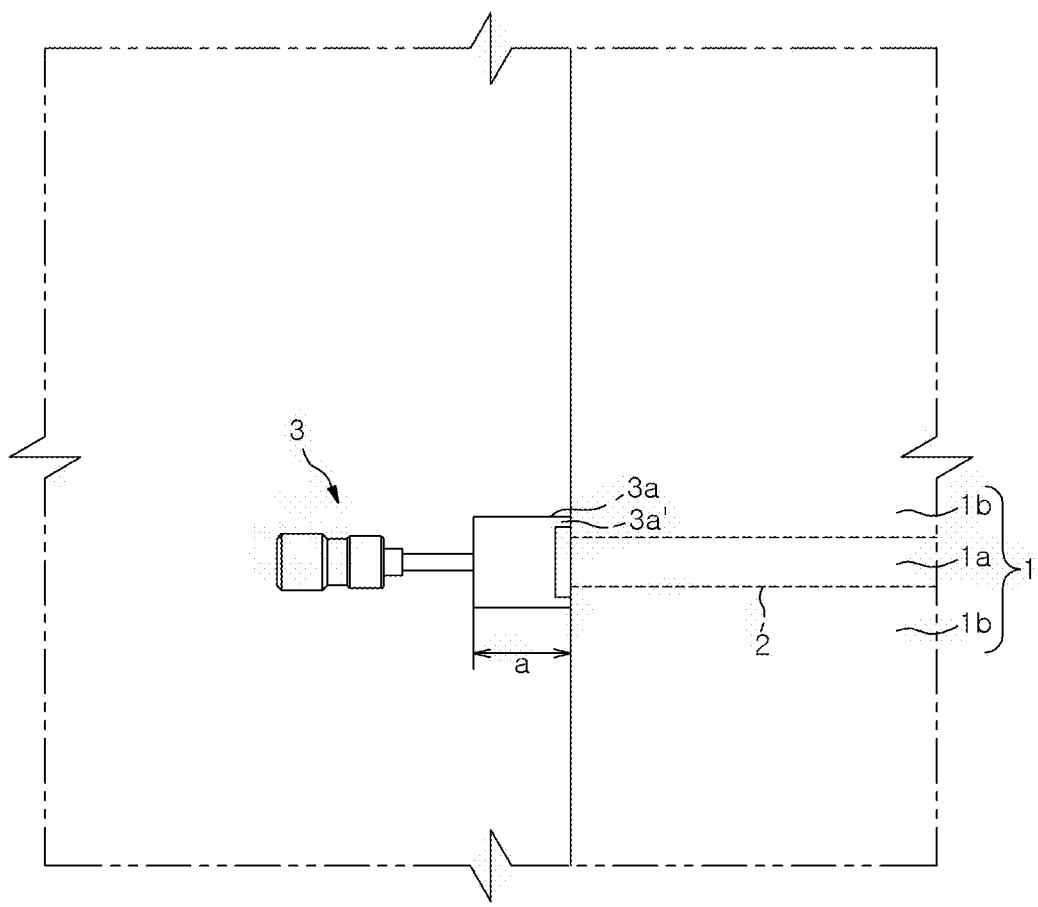
FIG. 3 is a view schematically showing a state in which a first drilling device is installed in a nuclear reactor in which a nuclear power plant activation structure is embedded.
Figure 4:
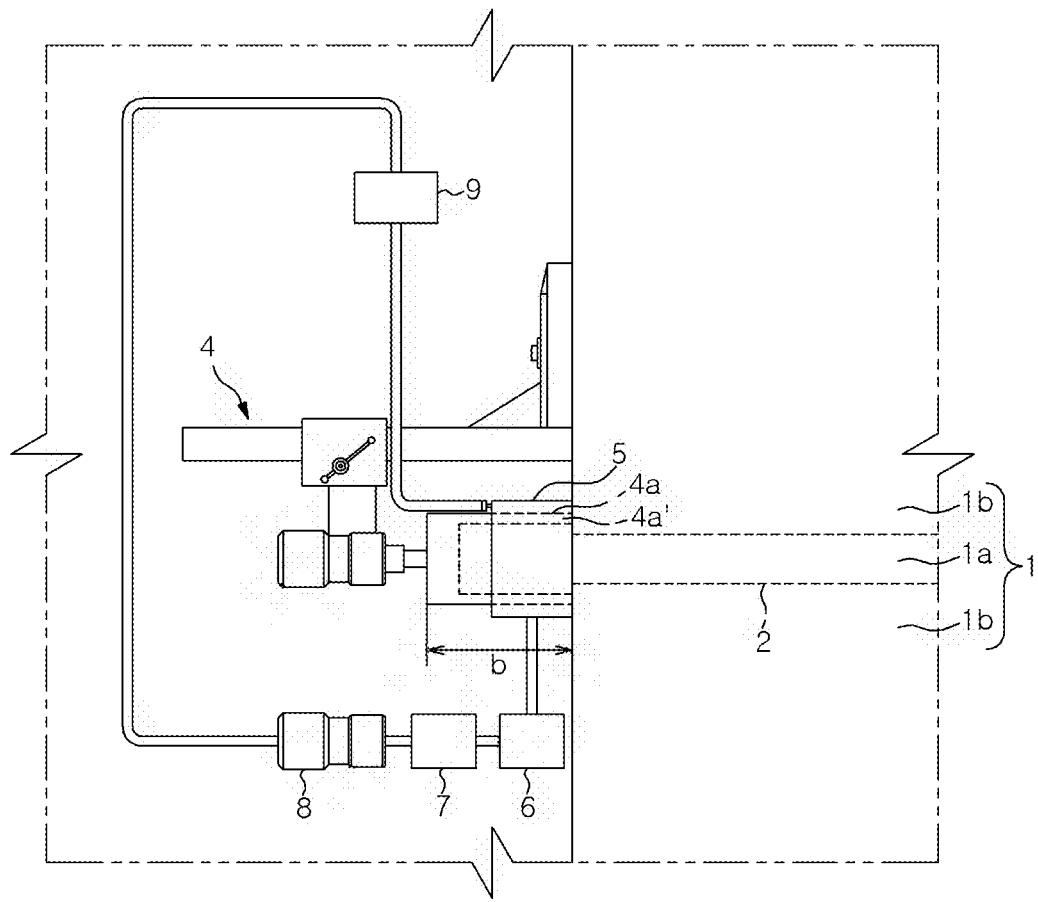
FIG. 4 is a view schematically showing a state in which a second drilling device is installed in the nuclear reactor in which the nuclear power plant activation structure is embedded.

Referring to FIGS. 1 to 4, the method of removing a nuclear power plant activation structure according to the embodiment of the present disclosure is a method provided to remove a nuclear power plant activation structure 2 buried in a nuclear reactor 1 before dismantling the nuclear reactor 1, and may include a step S100 of flattening at least a portion of a wall surface of a peripheral portion 1b of a wall of a nuclear reactor 1 including a buried portion 1a in which a nuclear power plant activation structure 2 is buried and the peripheral portion 1b circumferentially surrounding the buried portion 1a, a step S200 of installing drilling devices 3 and 4 in the flattened peripheral portion 1b to perform a drilling operation, a step S300 of extracting the nuclear power plant activation structure 2 from the buried portion 1a, and a step S400 of cutting the extracted nuclear power plant activation structure 2 and then storing the cut nuclear power plant activation structure in a shielding container.

Hereinafter, a method of removing the nuclear power plant activation structure 2 according to an embodiment of the present disclosure will be described for each step.

(Step S100 of Flattening at Least a Portion of Peripheral Portion 1b)

At least a portion of the wall surface of the peripheral portion 1b of the wall of the nuclear reactor 1 is filled with mortar so that the drilling devices 3 and 4 which perform the operation on the wall surface of the reactor 1 can be stably installed on the wall surface of the nuclear reactor 1. In this process, since an outer surface of the peripheral portion 1b is flattened, the drilling devices 3 and 4 can be firmly installed on the flattened outer surface of the peripheral portion 1b, and thus, the drilling operation can be performed on the peripheral portion 1b without shaking.

(Step S200 of Installing Drilling Devices 3 and 4 in the Peripheral Portion 1b Having the Flattened Outer Surface to Perform Drilling Operation)

First, a scattering prevention unit, for example, a temporary storage tent, is installed on the outer surface of the peripheral portion 1b so as to surround the drilling devices 3 and 4. Accordingly, scattering of dust, sludge, or the like generated in the subsequent drilling operation is prevented by the scattering prevention unit.

Meanwhile, the step S200 of installing the drilling devices 3 and 4 in the peripheral portion 1b having the flattened outer surface to perform the drilling operation includes a step S210 of performing a first drilling operation using a first drilling device 3, and a step S220 of performing a second drilling operation using a second drilling device 4.

Referring to the step S210 of performing the first drilling operation, when the installation of the scattering prevention unit with respect to the peripheral portion 1b is completed, an initial drilling position at which the peripheral portion 1b should be drilled is set to extract the nuclear power plant activation structure 2 from the buried portion 1a. In other words, in order to smoothly extract the nuclear power plant activation structure 2 from the buried portion 1a, the peripheral portion 1b is drilled through the first drilling device 3 and the second drilling device 4 to weaken the structural strength.

To this end, the first drilling device 3 is installed in the peripheral portion 1b so that the first drilling device 3 is in a parallel relationship with the nuclear power plant activation structure 2 based on an angle at which the nuclear power plant activation structure 2 is buried in the buried portion 1a.

In this case, the first drilling operation includes a dry drilling operation, and the first drilling device 3 may be a dry drilling device, for example, a dry core drill. Next, the reason why the first drilling operation is performed as the dry drilling operation will be described briefly. When the first drilling operation with respect to the peripheral portion 1b is performed as a wet drilling operation in which a cooling medium for cooling frictional heat generated between a first core bit 3a mounted on the first drilling device 3 and the peripheral portion 1b is used in the drilling operation, since the peripheral portion 1b is formed of concrete, the surroundings are contaminated by sludge generated by mixing dust generated during the drilling process and cooling medium such as cooling water and concrete.

Meanwhile, the first drilling device 3 on which the first core bit 3a is mounted is driven until the peripheral portion 1b is drilled to a predetermined first drilling thickness, for example, a depth of about 50 mm. In this case, an end portion facing the outer surface of the peripheral portion 1b among both end portions of the first core bit 3a has a first protrusion 3a' protruding along the circumferential direction of the first core bit 3a. Accordingly, as an example, the peripheral portion 1b corresponding to a radially outer side of the nuclear power plant activation structure 2 may be drilled in a donut shape.

In the present embodiment, a case in which the first drilling thickness of the first drilling device 3 with respect to the peripheral portion 1b is set to about 50 mm in advance is described as an example. However, this is only an example, and thus, a spirit of the present disclosure is not limited thereto. If necessary, the first drilling thickness of the first drilling device 3 with respect to the peripheral portion 1b is not set in advance, but the first drilling thickness of the first drilling device 3 with respect to the peripheral portion 1b can be flexibly changed depending on a degree to which the nuclear power plant activation structure 2 is buried in the buried portion 1a, a situation of the first drilling operation, or the like.

Next, the step of performing the second drilling operation S220 will be described, the second drilling operation is performed on the first drilled peripheral portion 1b using the second drilling device 4. In this case, the second drilling device 4 is installed in the peripheral portion 1b so that the second drilling device 3 is installed in a parallel relationship with the nuclear power plant activation structure 2 based on the angle at which the nuclear power plant activation structure 2 is buried in the buried portion 1a.

In this case, the second drilling operation is a substantial drilling operation in which the peripheral portion 1b corresponding to the radial outer side of the nuclear power plant activation structure 2 is drilled to smoothly extract the nuclear power plant activation structure 2 from the buried portion 1a, and a depth of the peripheral portion 1b drilled in the second drilling operation may be deeper than that of the peripheral portion 1b drilled in the first drilling operation.

When the second drilling operation is performed, a second core bit 4a is mounted on the second drilling device 4. In this case, a length "b" of the second core bit 4a mounted on the second drilling device 4 may be longer than a length "a" of the first core bit 3a mounted on the first drilling device 3 in the second step S200. For example, the second core bit 4a mounted on the second drilling device 4 may have the length "b" corresponding to the length of the nuclear power plant activation structure 2 buried in the buried portion 1a.

In this case, the second drilling device 4 on which the second core bit 4a is mounted is driven until the peripheral portion 1b is drilled to a predetermined thickness. At this time, an end portion of both end portions of the second core bit 4a facing the outer surface of the peripheral portion 1b has a second protrusion 4a' protruding along the circumferential direction of the second core bit 4a. Accordingly, as an example, the peripheral portion 1b corresponding to the radially outer side of the nuclear power plant activation structure 2 may be drilled in a donut shape.

Meanwhile, an operator checks an insertion state of the second core bit 4a inserted in the peripheral portion 1b in real time, and then, predicts in real time a position of an expected buried structure, for example, a reinforcing bar, a pipe, an H beam support, or the like according to the depth drilled through the second core bit 4a. Moreover, the operator performs the second drilling while checking in real time a jamming of the second core bit 4a, loosening and jamming of sludge, smooth supply of the cooling medium, or the like.

The second drilling operation includes a wet drilling operation, and the second drilling device 4 may be a wet drilling device using a cooling medium, for example a wet core drill. Meanwhile, in the second drilling operation by the second drilling device 4, the cooling medium, e.g., cooling water is provided to cool the frictional heat generated by the friction between the second core bit 4a of the second drilling device 4 and the peripheral portion 1b. The cooling medium is mixed with concrete or the like to generate sludge or dust which may contaminate surroundings.

In view of above, in the embodiment of the present disclosure, the cooling medium used for a second drilling operation, e.g., the cooling water, is collected, and dust or sludge is separated from the collected cooling medium. Moreover, the cooling medium from which the dust or sludge is separated is purified, and thus, can be reused as the cooling medium of the second drilling device 4.

More specifically, the cooling medium used in the second drilling operation is collected by a cooling medium collection unit 5 installed in close contact with the peripheral portion 1b so as to surround the second core bit 4a of the second drilling device 4 from the outside (step S221). Subsequently, the cooling medium collected through a drain hole (not shown) provided at a lower end of the cooling medium collection unit 5 is drained from the cooling medium collection unit 5 and transferred to a first water collecting tank 6 (step S222).

Next, while the cooling medium transferred to the first water collecting tank 6 stays in the first water collecting tank 6 for a predetermined time, the dust or sludge contained in the cooling medium is deposited in a lower portion of the first water collecting tank 6 and at least a portion of the dust or sludge contained in the cooling medium may be separated from the cooling medium (step S223). Moreover, the cooling medium from which at least a portion of the dust or sludge contained in the cooling medium is removed is transferred to a second water collecting tank 7 (step S224).

While the cooling medium transferred to the second water collecting tank 7 stays in the second water collecting tank 7 for a predetermined time, the dust or sludge remaining in the cooling medium can be separated from the cooling medium (step S225). Next, after purifying the cooling medium from which the dust or sludge is separated (step S226), the purified cooling medium is pumped by a pump 8 and transferred to the cooling medium storage tank 9. Moreover, if necessary, the cooling medium can be resupplied and reused as the cooling medium of the second drilling device 4 (step S227).

In this case, a flow rate of the cooling medium storage tank 9 in which the cooling medium to be supplied to the second drilling device 4 is stored is checked in real time to determine whether or not the cooling medium is smoothly supplied to the peripheral portion 1b during the second drilling operation. Moreover, color and temperature of the cooling medium collected in the first water collection tank 6 and the second collection tank 7 are checked in real time to determine whether or not the drilling operation is well performed by the second drilling device 4 without problems.

Meanwhile, if coal tar inside a liner of the nuclear reactor 1 is extracted during the second drilling operation, the drilling operation is immediately stopped, and a worktable for displacing the nuclear power plant activation structure (2) to be subsequently extracted from the buried portion 1a is installed.

In this case, a shielding facility such as lead glass is installed and a cutting device such as a band saw and a band saw device is installed in a direction in which the nuclear power plant activation structure 2 is extracted from the nuclear reactor 1. In addition, a shielding container for accommodating the cut nuclear power plant activation structure 2 is located inside the shielding facility.

(Step S300 of Extracting Nuclear Power Plant Activation Structure 2 from Buried Portion 1a)

When the shielding container for accommodating the nuclear power plant activation structure 2 is located inside the shielding facility, the nuclear power plant activation structure 2 can be extracted from the buried portion 1a through the holes formed in the peripheral portion 1b through the primary and second drilling. When the extraction of the nuclear power plant activation structure 2 from the buried portion 1a is completed, the nuclear power plant activation structure 2 extracted from the buried portion 1a is placed on the worktable and fixed to the worktable. Next, before the nuclear power plant activation structure 2 is cut, the concrete remaining around the nuclear power plant activation structure 2 is broken and removed by a breaker.

(Step S400 of Cutting Extracted Nuclear Power Plant Activation Structure 2 and Storing Nuclear Power Plant Activation Structure 2 in Shielded Container)

In both end portions of the extracted nuclear power plant activation structure 2, an end portion having a relatively large degree of radiation, that is, an end portion buried inside the nuclear reactor 1, is cut using a cutting device.

When the cutting of the nuclear power plant activation structure 2 is completed, the cut nuclear power plant activation structure 2 is remotely controlled and accommodated in the shielding container, and the shielding container is closed.

According to the method of removing the nuclear power plant activation structure according to the present embodiment as described above, it is possible to easily dismantle the nuclear power plant activation structure from the nuclear reactor, and thus, it is possible to reduce a dismantling period and a dismantling cost.

Hereinbefore, the embodiment of the present disclosure is described as a specific embodiment. However, this is only an example, and the present disclosure is not limited thereto and should be construed as having the widest scope according to a basic idea disclosed in the present specification. A person skilled in the art may combine/substitute the disclosed embodiments to implement a pattern of a shape that is not indicated, but this also does not depart from the scope of the present disclosure. In addition, a person skilled in the art can easily change or modify the disclosed embodiment based on the present specification, and it is clear that the changes or modifications also belong to the scope of the present disclosure.

What is claimed is:

1. A method of removing a radioactive structure within a wall in a nuclear power plant, comprising:
    flattening at least a portion of an uneven outer surface at a drilling portion of the wall, the uneven outer surface at the drilling portion of the wall extending in a vertical direction of the wall, wherein the radioactive structure is buried in the wall and the drilling portion is adjacent to the radioactive structure;
    installing at least two drilling devices in the flattened drilling portion and performing a drilling operation in a horizontal direction of the wall, the at least two drilling devices including a first drilling device and a second drilling device;

extracting the radioactive structure from the wall; and cutting the extracted radioactive structure and storing pieces of the cut radioactive structure in a shielding container, wherein the performing the drilling operation includes,
   performing a first drilling operation including a dry drilling operation using the first drilling device having a first core bit, and
   performing a second drilling operation including a wet drilling operation using the second drilling device having a second core bit, wherein the performing the second drilling operation includes,
   collecting a cooling medium used in the wet drilling operation using a cooling medium collection unit,
   transferring the cooling medium collected by the cooling medium collection unit from the cooling medium collection unit to a first water collection tank,
   depositing dust or sludge contained in the cooling medium in a lower portion of the first water collection tank to separate at least a portion of the dust or the sludge contained in the cooling medium,
   purifying the cooling medium from which the dust or the sludge is separated, and
   resupplying the purified cooling medium to reuse the purified cooling medium as the cooling medium of the second drilling device, and wherein at least one portion of the radioactive structure absorbs neutrons during an operation of a nuclear reactor included in the nuclear power plant so that the radioactive structure has radioactivity after the operation of the nuclear reactor, and wherein in the flattening, the at least the portion of the uneven outer surface is filled with mortar so that the at least two drilling devices are stably installed on the wall.

2. The method of claim 1, wherein the performing the second drilling operation further includes
   transferring the cooling medium collected in the first water collection tank to a second water collection tank, and
   depositing the dust or the sludge contained in the cooling medium on a lower portion of the second water collection tank to separate the dust or the sludge remaining in the cooling medium from the cooling medium.

3. The method of claim 2, wherein while performing the second drilling operation, the cooling medium is collected by the cooling medium collection unit provided to be in contact with the drilling portion to surround a periphery of the second core bit of the second drilling device and cool a friction heat generated in the second drilling operation.

4. The method of claim 1, wherein the flattening includes installing a scattering prevention unit in the uneven outer surface at the drilling portion of the wall in a contact manner to surround the at least two drilling devices.

5. The method of claim 1, wherein
   the performing the first drilling operation further includes,
      installing the first drilling device in the drilling portion so that the first core bit of the first drilling device is installed in a parallel relationship with the radioactive structure based on an angle at which the radioactive structure is buried in the wall, and
      driving the first drilling device so that the drilling portion is drilled to a first depth, and
   the performing the second drilling operation further includes,
      installing the second drilling device in the drilling portion so that the second core bit of the second drilling device is installed in a parallel relationship with the radioactive structure based on the angle at which the radioactive structure is buried in the wall, and
      driving the second drilling device so that the drilling portion is drilled to a second depth.

6. The method of claim 1, wherein a depth of the drilling portion drilled in the second drilling operation is deeper than a depth of the drilling portion drilled in the first drilling operation.

7. The method of claim 1, wherein a length of the second core bit mounted on the second drilling device in the second drilling operation is longer than a length of the first core bit mounted on the first drilling device in the first drilling operation.

8. The method of claim 1, wherein
   in the performing the drilling operation, each of the first core bit and the second core bit includes an end portion facing the drilling portion, and a protrusion protruding along a circumferential direction of each of the first core bit and the second core bit is formed in the end portion, and
   in the performing the drilling operation, the drilling portion is drilled in a donut shape by the first core bit and the second core bit, and the drilled donut shape surrounds an outer side of the radioactive structure.

* * * * *